United States Patent [19]

Strobl

[11] Patent Number: 5,216,305
[45] Date of Patent: Jun. 1, 1993

[54] ELECTRIC MOTOR WITH WALL SUPPORT OF U-SHAPED TERMINALS

[75] Inventor: Georg Strobl, Repulse Bay Garden, Hong Kong

[73] Assignee: Johnson Electric S.A., Switzerland

[21] Appl. No.: 780,711

[22] Filed: Oct. 18, 1991

[30] Foreign Application Priority Data

Oct. 19, 1990 [GB] United Kingdom ............... 9022730

[51] Int. Cl.$^5$ ............................................. H02K 11/00
[52] U.S. Cl. ...................................... 310/71; 310/249; 439/856
[58] Field of Search ...................... 310/71, 89, 249; 439/592, 593, 743, 747, 833, 839, 842, 845, 861, 856

[56] References Cited

U.S. PATENT DOCUMENTS

| | | | |
|---|---|---|---|
| 2,578,436 | 12/1951 | Lundy | 439/861 |
| 2,853,689 | 9/1958 | Jackson et al. | 439/747 |
| 3,409,860 | 11/1968 | Kirby | 439/743 |
| 4,568,138 | 2/1986 | McKenzie | 439/592 |
| 4,866,317 | 9/1989 | Katayama | 310/89 |
| 4,873,464 | 10/1989 | Wang | 310/239 |

FOREIGN PATENT DOCUMENTS

| | | | |
|---|---|---|---|
| 85856 | 9/1965 | France | 439/833 |
| 2013992 | 8/1979 | United Kingdom | |
| 2203294 | 10/1988 | United Kingdom | |

Primary Examiner—Steven L. Stephan
Assistant Examiner—Ed To
Attorney, Agent, or Firm—Ostrolenk, Faber, Gerb & Soffen

[57] ABSTRACT

An end cap of a fractional horsepower electric motor has channels 27 in which female terminals 18 connect to a power supply plug. The terminals 18 are shaped and configured to ensure good electrical connection with the plug terminals and to prevent the plugs inadvertently disengaging during operation of the motor.

2 Claims, 1 Drawing Sheet

5,216,305

ELECTRIC MOTOR WITH WALL SUPPORT OF U-SHAPED TERMINALS

BACKGROUND OF THE INVENTION

The invention relates more particularly to fractional horsepower permanent magnet direct current motors. Such motors must be provided with power terminals for connection to an external power supply. As the motors are often required for use in a confined space, the terminals must not add to the space required for the motor body or so far as possible increase the size of the body. It is already known to provide female terminals connected inside the motor for connection in use to an external plug. Those terminals include a goose-neck portion which resiliently presses respectively against one side of each male plug connector when it is inserted into the motor body. Such terminals can be easily strained, and so reduce the effective contact pressure if the plug connector is inserted out-of-line and too much towards the goose neck portion. The goose neck portion provides generally only a point or line contact with each plug after insertion.

BRIEF DESCRIPTION OF THE INVENTION

According to the present invention there is provided an end cap for a fractional horsepower motor in which elongate channels are provided extending axially through the end cap to receive female power supply terminals for connection inside the motor to a brush assembly and to receive male terminals of a power supply plug, each female terminal comprising a planar sheet of resilient conductive material which is centrally folded to form a generally U-shaped terminal with opposing limbs which extend along opposite sides of the channel and in use which contact opposite sides of a respective male terminal inserted between the limbs.

Each female terminal is normally anchored at its base and formed adjacent its base with at least small lateral separations between the outside surfaces of the limbs and respective inside surfaces of the channels.

The limbs are preferably curved inwards towards one another intermediate their lengths so as to have a natural separation significantly less than that of the external width of each male terminal. The limbs adjacent their extreme ends may bear against respective inside surfaces of the channel.

The opposite surfaces of the limbs may be arcuate in section to form contact surfaces which in use partially wrap around the outer surface of a respective cylindrical male terminal where such a male terminal is used.

BRIEF DESCRIPTION OF THE DRAWINGS

The invention will be further described by way of example with reference to the accompanying drawings, in which.

DETAILED DESCRIPTION OF THE PREFERRED EMBODIMENT

Figure 1:
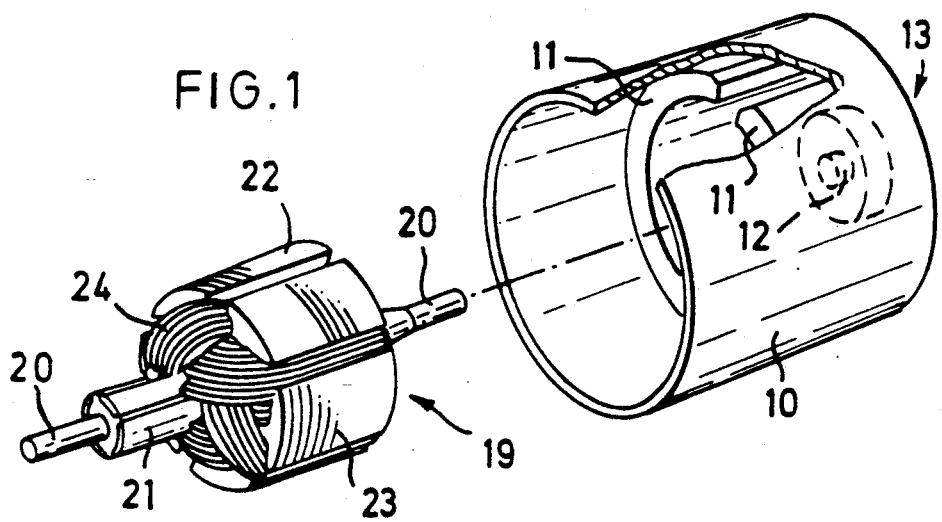
FIG. 1 is an exploded perspective view of part of a fractional horsepower PMDC motor embodying the invention.

Referring to the drawings, the fractional horsepower PMDC motor has a housing comprising a deep drawn can-like steel casing 10 carrying permanent magnets 11, and a bearing 12 in an end wall 13. The casing 10 is closed by a plastic end cap 14 which carries a bearing 15, two brushleaves 16 each carrying a brush 17 and two female terminals 18 in electrical contact with the brushleaves 16 via rivets connecting the terminals 18 to brush leaf mounting plates 25. A rotor 19 of the motor comprises a shaft 20, a commutator 21 and wound armature 22 mounted on the shaft 20. The armature 22 comprises a stack 23 of steel laminations which are a tight fit on the shaft 20 and a wire winding 24 wound about the arms of the armature and connected to the commutator 21.

Figure 4:
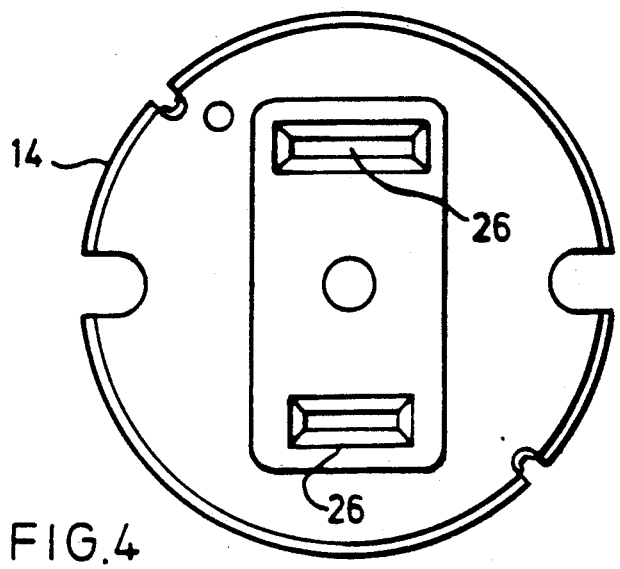
FIG. 4 shows an end outside view of the end cap.

In the assembled motor the shaft 20 runs in the bearings 12 and 15, the end cap 14 closing the casing 10 and the brushes 17 bearing on the commutator 21. The end cap 14 is provided with two apertures 26, best seen in (FIG. 4), for receiving an external power supply plug (not shown) having two flat male conductive terminals which fit through respective apertures 26.

Figures 2, 3:
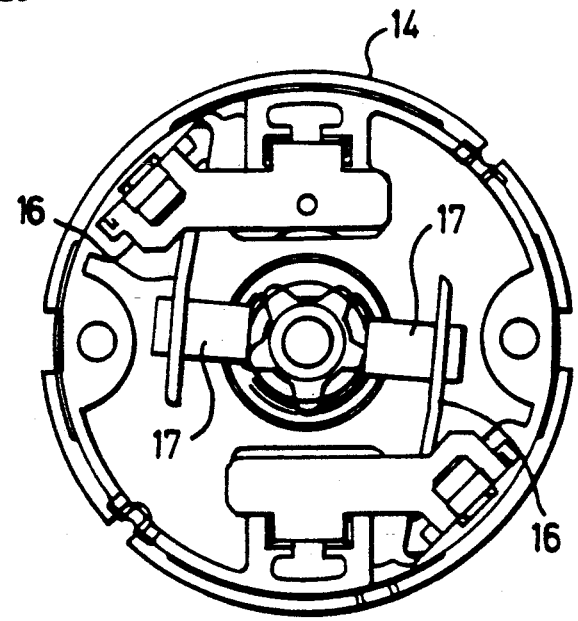
FIG. 2 is a sectional side view of an end cap for the motor of FIG. 1, in which is mounted a brush assembly and female terminals for receiving electrical power from an external source.
FIG. 3 shows an end inside view of the end cap.
Figure 5:
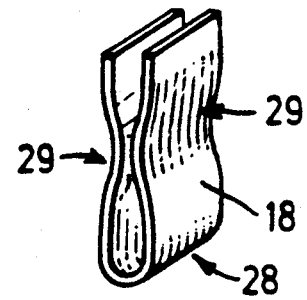
FIG. 5 shows in larger scale a female terminal.

The female terminals 18 are mounted in elongate axial channels 27 formed in the end cap 14. The female terminals 18 are formed from resilient electrically conductive sheet material centrally folded to form U-shaped terminals, as best illustrated in FIG. 5, with upstanding opposing limbs 29. The U-shaped terminals 18 are preferably anchored at their base by rivets to respective brush leaf mounting plates 25. It will be noted that there are small lateral separations adjacent a base 28 of each female terminal 18, shown for example at A of FIG. 2, between the outside surfaces of the limbs 29 and respective inside surfaces of the channels 27. The limbs 29 are formed so as to curve naturally inwardly towards one another and to come closest to one another intermediate the lengths of the limbs about two-thirds up from the base 28. The separation between the limbs 29 at their uppermost ends is generally greater than at least the forward end of each male terminal, which is often chamfered. The uppermost ends of the limbs 29 press against the inside of the channels 27 at least when the male terminals are inserted, so that the upper part of the limbs 29 press against the inside of the channels 27. The male terminals are firmly gripped when fully inserted and are prevented from being easily removed or vibrating free during operation of the motor.

The main flexing of the limbs 29 takes place about the separation points A, and also, the limbs 29 are pressed away from one another principally at the region two thirds the way up from the base 28. The plug terminals are thus inherently or tend to be centralized between the limbs and also cannot overstrain the main flexing points next to points A. The resilience of the limbs 29 about the points A is enhanced because the uppermost ends of the limbs 29 press against the inside of the channels 27 to establish ancilliary fulcrums about which the limbs flex as the plug terminals are inserted. Since the uppermost ends of the limbs 29 are separated by somewhat more than the thickness of the male terminals, and entry between the limbs 29 is assured. The planar surfaces of the limbs 29 also provide large area electrical contacts on both sides of each male terminal. Further, as mentioned above, the outer surfaces of the limbs 29 are normally pressed against and supported by the inside surfaces of the channels 27 so that the male terminals are firmly gripped in a manner in which the female connector is well supported by the inside surfaces of the channels 27.

It will be noted that where a male terminal of cylindrical form is to be used, the apertures 26 will normally be made circular, the inner surfaces of the limbs 29 can be formed with curved opposing surfaces that partially wrap around opposing sides of each male terminal when it is inserted. Nevertheless, provided such a male terminal of suitable dimensions can be inserted in the apertures 26 (or the apertures suitably adapted), the generally planar form of limbs 29, shown particularly in the FIGS. 2 and 5, can still be used. As such, the female terminals still provide a better connection than prior art arrangements, because they contact opposite sides of each male terminal and the grip to hold the male terminal is still normally partly provided because the outside of the limbs 29 can be arranged to press to some extent against the inside surfaces of the channels 27.

The described terminals are provided as required without adding to the space otherwise required by the motor casing and end cap and to not protrude from the end cap.

It is desirable in many applications, especially where a double or triple pronged male terminal is used, to accommodate tolerances. The female terminals described can readily accept normal differences of the plugs because of the double sided limbs 28. Each side can, where necessary, be somewhat differently loaded, for example, and yet maintain good surface to surface contact with each side of the male terminals. Because the limbs are arcuate shaped as described, the original minimum gap, intermediate their lengths, can be much less, as they are spring loaded from both sides. Further, because both limbs of the female terminal flex, the amount of movement for achieving good entry and pressing against the sides of the male terminal is much less than required for other terminals such as a goosenecked arrangement.

The tolerance in the female terminals may be additionally or alternatively required where male terminals are used together with a motor end cap or cover, which is provided with locating and fixing prongs, such as tongues 20 described in GB Application 8822321.9.

I claim:

1. The combination, comprising:
   (a) an end cap for a fractional horsepower motor, said end cap having an axially extending, elongated channel formed therein for receiving a male terminal of predetermined size;
   (b) a brush assembly and a brush leaf mounting plate both mounted in said end cap, with said brush assembly being supported by said brush leaf mounting plate;
   (c) a female terminal located in said channel and comprising a planar sheet of resilient conductive material which is centrally folded into a generally U-shaped terminal having first and second opposing limbs and a narrow base connecting said limbs, said female terminal being anchored into said channel at said base and being electrically and mechanically connected to said brush leaf mounting plate, said limbs extending along respective sides of said channel with a central opening between said limbs into which a male terminal of said predetermined size may be inserted, each limb being spaced from its respective side of said channel by a small lateral separation at a position adjacent said base, said limbs including portions intermediate their lengths that are curved inwardly towards one another so as to have a nominal separation when said portions are relaxed which is less than said male terminal of predetermined size at its width, each of said portions when relaxed being spaced from the side of said channel adjacent thereto by substantially more than said small lateral separation, and distal ends of said limbs pressing against their respective sides of said channel after said male terminal is inserted into said female terminal.

2. The combination according to claim 1, in which the limbs include opposite surfaces that are arcuate in section to form contact surfaces which in use partially wrap around an outer surface of a cylindrical male terminal of said predetermined size.

* * * * *